United States Patent [19]

Eshel

[11] Patent Number: 4,831,541
[45] Date of Patent: May 16, 1989

[54] SYSTEM FOR EDITING REAL AND VIRTUAL STORAGE AND SECONDARY STORAGE MEDIA

[75] Inventor: Marc M. Eshel, Scarsdale, N.Y.

[73] Assignee: International Business Machines Corporation, Armonk, N.Y.

[21] Appl. No.: 205,019

[22] Filed: Jun. 7, 1988

Related U.S. Application Data

[63] Continuation of Ser. No. 814,357, Dec. 30, 1985, abandoned.

[51] Int. Cl.[4] .......................... G06F 12/08; G06F 9/00
[52] U.S. Cl. .................................. 364/200; 364/228.2; 364/256.6
[58] Field of Search ... 364/200 MS File, 900 MS File

[56] References Cited

U.S. PATENT DOCUMENTS

| | | | |
|---|---|---|---|
| 4,459,661 | 7/1984 | Kaneda et al. | 364/200 |
| 4,528,624 | 7/1985 | Kamionka et al. | 364/200 |
| 4,533,996 | 8/1985 | Hartung et al. | 364/200 |
| 4,564,903 | 1/1986 | Guyette et al. | 364/300 X |
| 4,660,144 | 4/1987 | Walsh | 364/200 |
| 4,742,450 | 5/1988 | Duvall et al. | 364/200 |

OTHER PUBLICATIONS

N. Inaba et al., "Programmer Aid for the Alter/Display Facility", IBM TDB, vol. 21, No. 12, May 1979, p. 4946.
Virtual Machine/System Product, "General Information", CMS User's Guide, System Logic and Problem Determination Guide, vol. 1, 1984.
"CMS File System in Release 2 of VM/370 Basic System Extensions", IBM Corp., 1979.
*Some VM/SP Basics,* Chapter I, 1984, p. 25.
*A Closer Look at CP,* VM/SP Introduction, 1984, pp. 82, 83.
C. W. Fraser, "A Generalized Text Editor", Mar. 1980, vol. 23, No. 3, pp. 154–158, *Communications of the ACM*.
Charlton et al., "Tools and Techniques for Teaching Microprocessor Software Development", 1983, vol. 13, pp. 909–920, *Software–Practice & Exp*.

*Primary Examiner*—Raulfe B. Zache
*Assistant Examiner*—Florin Munteanu
*Attorney, Agent, or Firm*—Pollock, Vande Sande & Priddy

[57] ABSTRACT

An editing system for use in a virtual machine environment in which two virtual machines having corresponding virtual storage areas are operatively related to one another. The editing system allows a first virtual machine to print, display, modify and otherwise control and process information stored in a second virtual machine storage area.

17 Claims, 4 Drawing Sheets

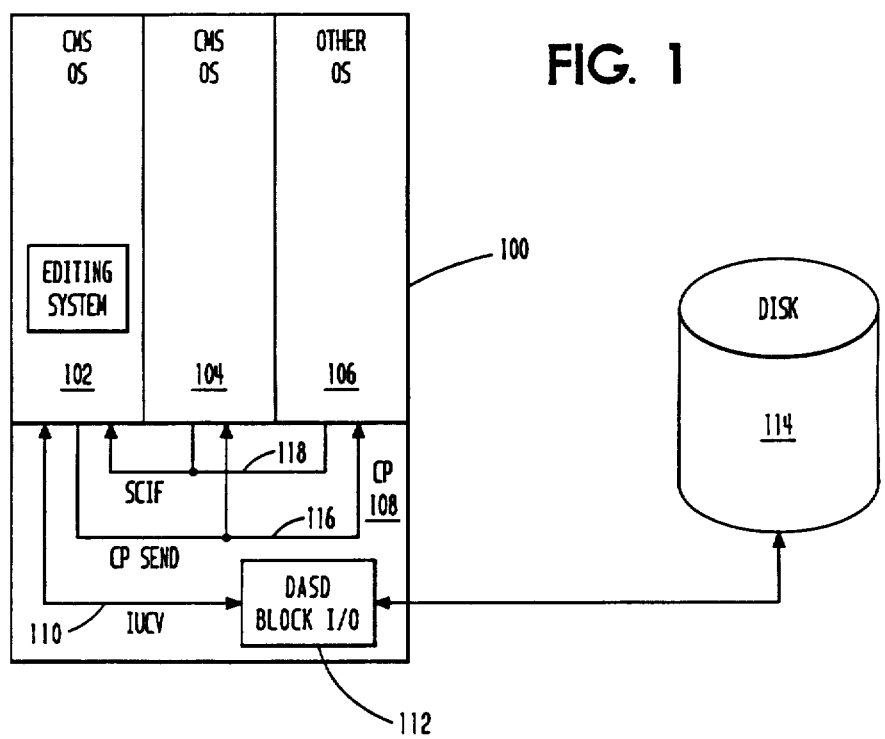
FIG. 1
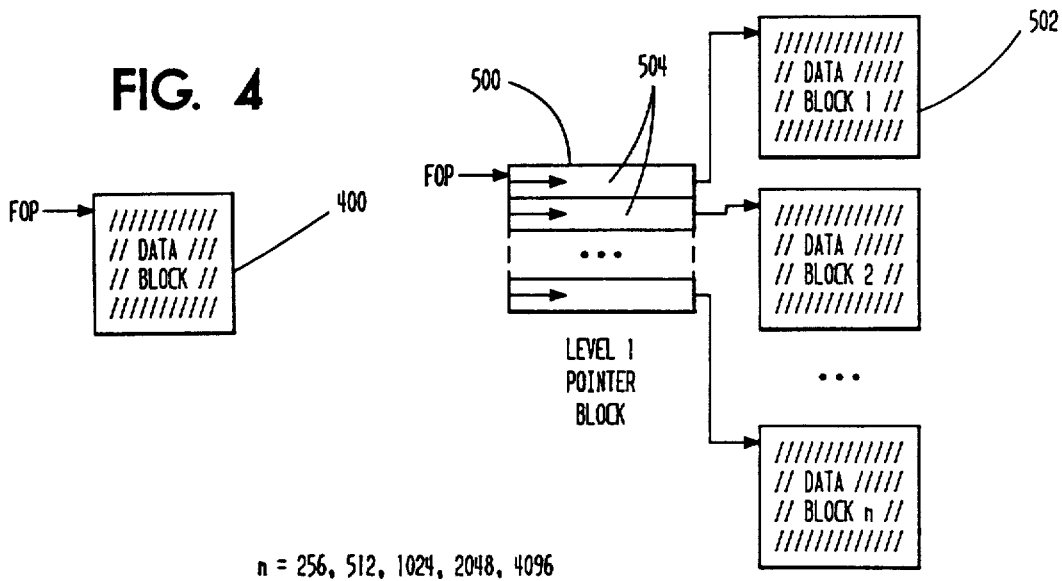
FIG. 4
FIG. 5
n = 256, 512, 1024, 2048, 4096

SYSTEM FOR EDITING REAL AND VIRTUAL STORAGE AND SECONDARY STORAGE MEDIA

This application is a continuation, of application Ser. No. 814,357, filed 12/30/85, now abandoned.

BACKGROUND OF THE INVENTION

The present invention relates to a computer editing system and, more particularly, to a system for editing storage information in a virtual machine (VM) environment.

In computing systems, numeric or alphanumeric information is often stored and later retrieved for display, printout, modification, duplication or other use. As computing systems become more complicated, it is increasingly more difficult to access only selected parts of such stored information and to modify such data without affecting other information stored on the same medium.

Editors have been devised to allow a user to access a relatively small portion of the stored information and to modify it as required. An editor for real and virtual storage, for example, is disclosed in IBM Technical Disclosure Bulletin Volume 21, No. 12, page 4946 (May 1979), by N. Inaba et al, titled "Programmer Aid for the Alter/Display Facility".

Computing systems generally have so-called real storage. Real storage is the main, physical memory in any computing system. It may consist of memory devices such as random access memory (RAM) into which information may be written. Such real storage, in the case of a multi-user or time sharing environment, can be reused for each task that is being performed. In such a way, each user working on the same computing system has access to the entire real storage during the time his or her task is being performed.

Logistically, each one of a plurality of users has access to all of the real storage at a given predetermined time because information is swapped between the real storage area and a permanent or semi-permanent medium, such as a magnetic disk or the like. In that way, as each user accesses information, data that is stored on a storage medium for other users is invisible to the current user and does not infringe the current user's storage space.

Another concept that has proven useful in computing systems, especially in multi-user environments, is commonly called virtual storage. Virtual storage allows two or more users to access the real storage of the computing system, but to have the addressable locations automatically translated or mapped into the original addresses. Thus, each of a plurality of users may believe that he or she is accessing information in the same storage locations, beginning at the lowest end of the real memory. The size of virtual storage is limited by the addressing scheme of the computer system and by the amount of auxiliary storage available, and not by the actual number of main storage locations.

A so-called virtual machine is a functional simulation of a computer and its associated peripheral devices. As such, a virtual machine is controlled by a suitable operating system. It should be noted that virtual machines use similar concepts to virtual storage in that as far as each user is concerned, all of the system peripheral devices are exclusively controlled by the VM operating system.

Because the information that is stored may be of a confidential nature, it is often difficult to edit the entire storage or portions thereof without using a special security code or unlocking device.

Heretofore, if a user or programmer wished to display virtual machine storage, he or she used a control program command, such as the DISPLAY command, followed by an address, to display the contents of the requested storage area. If the user decided to modify any of the requested data, he or she then entered a STORE command, followed by the location to be modified and by the new data. This procedure was often time consuming if the programmer wished to modify several different storage locations. Moreover, there was the possibility that the wrong address would be keyed in or otherwise entered and the store operation would be performed with respect to the wrong location, resulting in inaccurate data at both addresses: the intended one and the inadvertently accessed one. The editing systems thus required great accuracy in their use because if an error were made in the course of editing, affected files could have been irrevocably damaged or irretrievably lost.

An editing system that analyzes the information in a block of data before allowing the user to modify it is not useful. For example, consider a block of data that includes directory information with pointers and addresses. If one of the addresses is incorrectly stored, the system will access the wrong location, losing track of the data flow and resulting in an abnormal and unpredictable operation.

There is often a need for a user to access one virtual machine storage area from another virtual machine. Thus, it would be advantageous to have a system, such as a storage editor, that would allow a user to do so.

Moreover it would be desirable for a user to be able to access one full screen of data in a storage area at a time.

It would further be advantageous for a user to be able to invoke such a storage editor from a control program, for example, while tracing a program listing.

It would also be advantageous to be able to execute a program on a virtual machine under the control of another virtual machine.

It would further be advantageous for a system to access a block of data at a time regardless of the information contained therein. And, similarly, it would be desirable for a screen of information to be brought into a user's display for modification regardless of the information exhibited on that screen.

Moreover, it would be advantageous for information such as addresses and index data to be correctable and restorable onto the media from which it was taken.

SUMMARY OF THE INVENTION

In accordance with the present invention, there is provided an editing system for use in a virtual machine environment in which two virtual machines having corresponding virtual storage areas are operatively related to one another. The editing system allows a first virtual machine to print, display, modify and otherwise control and process information stored in a second virtual machine storage area. Blocks of data are accessed regardless of any errors or other information contained therein. This concept is most useful in the field of secondary storage media such as disks.

Moreover, in addition to processing data in a VM storage area, a program may be run or executed under control of a user having a different user identification. The present system can be invoked and utilized by any one of a family of computer terminals.

BRIEF DESCRIPTION OF THE DRAWINGS

A complete understanding of the present invention may be obtained by reference to the accompanying drawings, when taken in conjunction with the detailed description thereof and in which:

FIG. 1 is a schematic representation of the editing system environment in accordance with the present invention;

FIGS. 4-7 are block diagrams of the data structure of a CMS minidisk.

DETAILED DESCRIPTION OF THE PREFERRED EMBODIMENT

Figure 2:
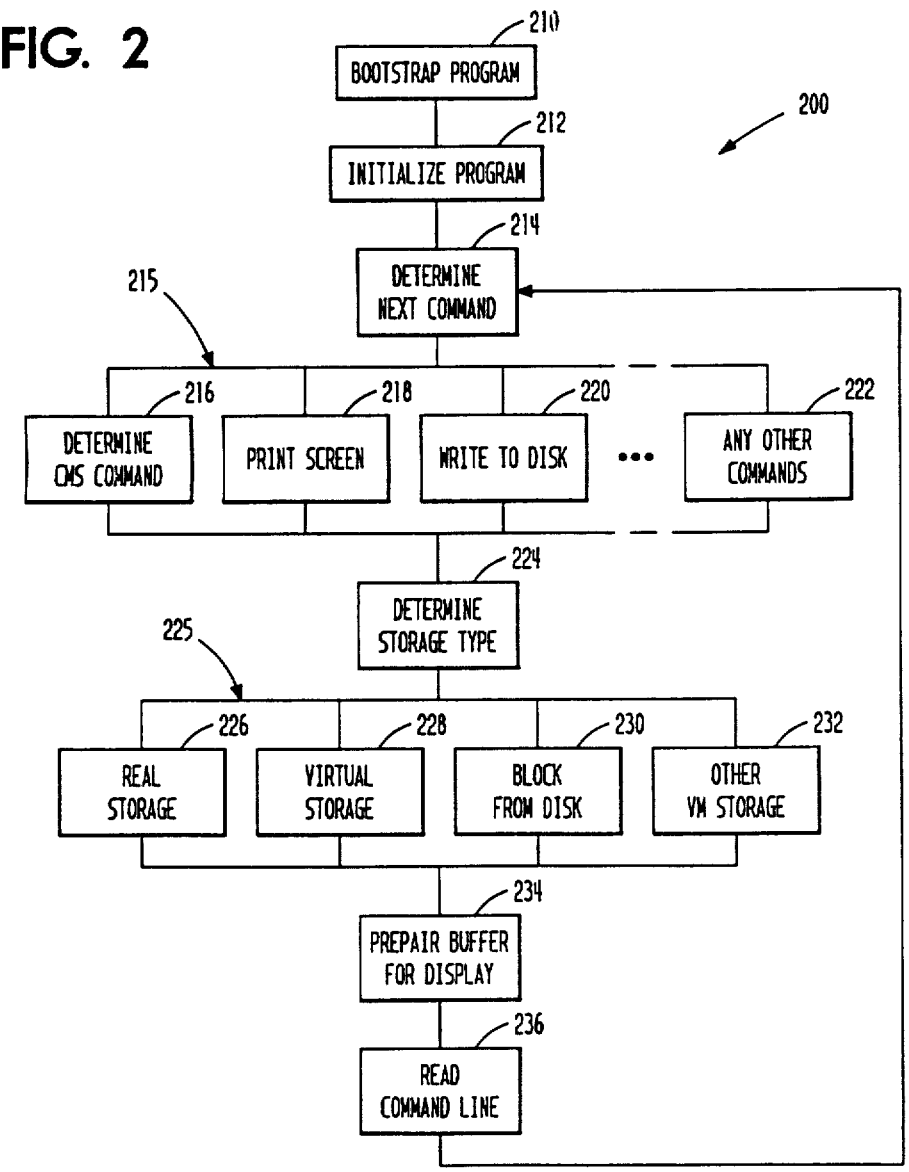
FIG. 2 is a flow chart depicting the steps performed in accordance with the present invention.

Referring now to FIG. 1, there is shown an environment in which the editing system of the present invention may be used. Reference can also be made to the following IBM Corp. publications for background information relating to the environment in which the present invention is intended to operate:

"Virtual Machine/System Product General Information", "Virtual Machine/System Product Introduction", "Virtual Machine/System Product System Logic and Problem Determination Guide Volume 1 (CP)" and "Virtual Machine/System Produuct CMS User's Guide".

A Virtual Machine/System Product (VM/SP) is shown at reference numeral 100. The VM/SP system includes three or more operating systems in the preferred embodiment. The CMS operating system (OS) is used by one user as a virtual machine identified by reference numeral 102. The editing system of the present invention—labelled "EDITING SYSTEM" in FIG. 1—is adapted to be executed in such a virtual machine 102.

Adjacent to the virtual machine 102 is a second CMS operating system 104. One or more other operating systems may be adjacent to the second CMS operating system. The additional operating systems are identified generally as reference numeral 106 in FIG. 1.

A control program (CP) 108 underlies the operating systems 102, 104 and 106. Accordingly, the operating systems run above or on the control program 108.

A communication path 110 is established between the control program 108 and the user's operating system 102. This communications path 110 is known as an Inter-User Communication Vehicle (IUCV). The IUCV communications path 110 connects the virtual machine 102, 104 or 106 to a DASD BLOCK I/0 service 112. The DASD BLOCK I/0 service 112, in turn, is adapted to read and write blocks on a secondary storage facility, such as a minidisk 114.

A CP SEND command 116 can be initiated by the user's or primary virtual machine 102 and directed to any of the other, secondary operating virtual machines 104, 106 that may be running other operating systems. Signals can be generated by the secondary virtual machines 104, 106 and returned to the primary virtual machine 102 by means of a single console image facility (SCIF) 118. All responses, messages or signals from the secondary virtual machines 104, 106 that normally would be displayed at a user's terminal are instead directed to the primary virtual machine 102 in response to the CP SEND command previously initiated by the primary virtual machine 102.

It would be helpful at this point to describe the operation of the editing system in accordance with the present invention in general terms with reference to FIG. 1. A human user, not shown, on a primary virtual machine 102 may desire to access and modify data that is stored in the storage area of a secondary virtual machine 104, 106. Accordingly, the user invokes the editing system which uses the CP SEND command 16 to access the desired data from a secondary virtual machine 104 or 106. Any secondary virtual machine storage area can be accessed, but only one storage area can be accessed at a time.

The first virtual machine 102 accesses data in the secondary virtual machine storage area 104, 106 without the need for a second user's attention or knowledge. The data in the second virtual machine storage area 104, 106 is sent to the first virtual machine 102 via the SCIF facility 118. Once the user of the first virtual machine 102 has made modifications to the data, the editing system sends the updated data back to the storage area of the secondary virtual machine 104, 106 via the CP SEND command 116.

Similarly, the user of the first virtual machine 102 can access data that is residing on secondary storage media, such as the minidisk 114. To do this, the editing system accesses the minidisk 114 by means of the DASD BLOCK I/O service 112 over the Inter-User Communication Vehicle (IUCV) 110. This DASD BLOCK I/O service 112 is a bidirectional vehicle. Thus, responses from the minidisk 114 are sent over the same line as are requests from the first virtual machine 102.

For the editing system to execute in one virtual machine and operate on the storage area of a second virtual machine, the second user identification must be defined and identified as such to the first one.

A PROFILE subroutine allows a user to set the program function (PF) keys and colors for different fields on the display screen. A description of a screen is provided hereinbelow in conjunction with FIG. 3.

The editing system of the present invention runs under an operating system such as VM/SP CMS and provides the ability for a user to display and modify real or virtual storage and secondary storage media such as magnetic disks in a full screen fashion. The screen manager used in this invention is referred to as IOS3270, allowing the editing system to be used from any IBM Model 327X terminal.

The virtual machine storage area that is being edited may be either the user's or another virtual machine. The user can locate specific data in storage, scroll up and down, and modify storage by moving the cursor to either the hexadecimal data fields or translated EBCDIC fields and type over what is currently displayed. The user can issue any CP, CMS or EXEC commands from the editing system command line without affecting the editing system program. Moreover, the editing system can be invoked from CP, when previously initialized from the CMS operating system, even while a user is tracing a program.

All of the aforementioned operations can be performed with CMS secondary storage media, such as disks, without accessing the media. This can be useful for tracing through file pointers and rebuilding them. The media label itself may also be changed, if desired. In the preferred embodiment, a minidisk is used as the secondary storage media. Minidisk data blocks are read and written in accordance with the structure hereinbelow described.

Referring now also to FIG. 2, there is shown a flow chart at reference numeral 200 depicting the operation of the editing system in accordance with the present invention. The program is loaded as a nucleus extension, step 210, and control is relinquished to the program.

The program then sets addressability, initializes flags and variables, sets different program status words (PSW), verifies terminal type and screen size, allocates free storage and reads the profile to set program function (PF) keys and colors, step 212.

The next command is then determined, step 214. A command handling procedure, shown generally at 215, is then initiated depending upon what command is received. The command may be one that is suitable for CMS execution, step 216, in which case the system passes this command to the CMS operating system.

If the command received at step 214 indicates that a screen image is to be printed, step 218, the editing system operates on it.

The command received at step 214 may also indicate that a block is to be written onto the disk, step 220. In this case, a subroutine BLOCKIO is called. BLOCKIO can be invoked either to read from or write to a disk on a block by block basis.

Finally, any other commands received at step 214 can be handled by the system in an appropriate manner, step 222.

The storage type is then determined, step 224, and a storage handling procedure, shown generally at 225, is initiated depending upon what storage type is identified. One of the storage types is real storage, step 226. A CP diagnostic procedure called DIAG 4 is invoked to get data from real storage.

Another storage type received at step 224 is virtual storage, step 228. An assembler instruction called MVCL is used to get data from virtual storage.

Another storage type received at step 224 refers to a block that is accessed from the disk, step 230. The DASD BLOCKIO service 112 (FIG. 1) is used to transfer a block of data to or from a disk 114.

Finally, another VM storage area can be accessed by means of the CP SEND command and SCIF facility, step 232.

The buffer is then processed for display of the data therein, step 234. A program called IOS3270 is then called and executed for display of this data.

Finally, the command line is read, step 236 and any screen modifications are made. At this point, the next command is received, step 214, for further processing in accordance with the aforementioned procedure.

The structure of the file system on a CMS minidisk in accordance with the present invention is hereinbelow described, from directory to data block. It should be understood that one familiar with the following file structure may use the editor of the present invention to modify or correct errors in data stored in this file system.

The Master File Directory contains two sets of information: pointers to control blocks that describe all actual files, called File Status Table Blocks (FSTB), and pointers to a bit map that describes the status of all CMS blocks.

The actual data of a file is contained in either 512, 1024, 2048 or 4096-byte blocks, called data blocks. Files consist of data blocks and pointer blocks which chain the data blocks together. All blocks have the same size according to the disk's format. Depending on the size of a file (i.e., the number of data blocks to be chained), multiple levels of pointer blocks are created. The File Status Table Entry contains a pointer to a control block that describes how the data blocks of a file are chained together.

The CMS FORMAT command allows the user to choose one of these block sizes when he or she formats the minidisk. The block size is a characteristic of the CMS disk and not of the actual file. One CMS disk cannot contain a mixture of block sizes. The default block size is 1024 bytes.

A CMS disk contains a CMS label in one of its first CMS blocks. The label contains the CMS block size, the Disk Origin Pointer and a disk creation date.

A file is described by a File Status Table. The File Status Table is 64 bytes long. It uses fullword fields for the File Origin Pointer (FOP), the CMS block counter and the Item Counter. The date-last-written field contains dates, hours, minutes and seconds. The item counter is a full word with a capability of $2^{31} - 1$ addressable items.

Referring now also to FIG. 4, the pointer block structure is best explained by considering a small file which grows continuously. If the data fits in one data block 400, the File Origin Pointer (FOP) in the FST points only to that block 400.

Referring now also to FIG. 5, a level 1 pointer block 500 is created if the data does not fit in one data block 502. This pointer block 500 contains as many fullword pointer fields 504 as fit in one block and consequently can point to 256, 512, or 1024 data blocks, depending on the disk's block size. The File Origin Pointer now points to the level 1 pointer block.

Figure 6:
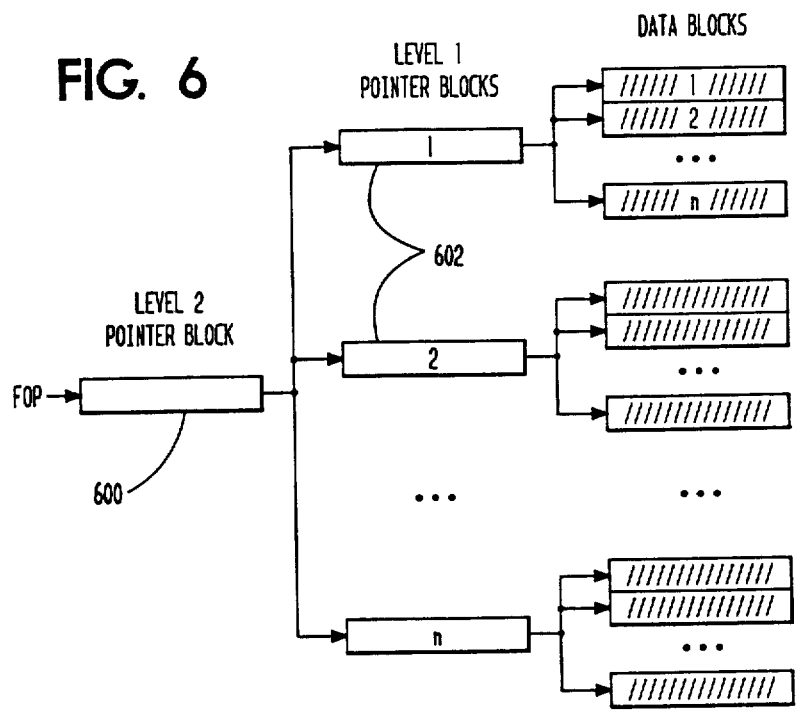

Referring now also to FIG. 6, a level 2 pointer block 600 is created if the data requires more data blocks than to which one pointer block can point.

A level 2 pointer block 600 has the same structure as the level 1 pointer block 602 (reference numeral 500 in FIG. 5). Its pointers, however, point to 256, 512, or 1024 level 1 pointer blocks 602, depending on the disk's block size. They are called indirect pointers, as opposed to direct pointers which point directly to data blocks.

If the file is so big that a level 2 pointer block structure cannot handle it, a level 3 pointer block, not shown, is created. It can point to 256, 512 or 1024 level 2 pointer block structures, depending on the disk's block size.

In the same way higher levels of pointer blocks can be created as the file grows. This design creates a tree structure that is limited only by the addressing maximum of the pointers. Pointer blocks contain relative block numbers. They cannot exceed fullword capacity ($2^{31} - 1$). Thus, the total number of blocks —data and pointer—per file is limited to $2^{31} - 1$.

The file directory on a disk contains the File Status Tables of all files on the disk. It has data blocks and pointer blocks. It is, therefore, called the Directory File. Its filetype is "DIRECTOR" and its filename is X'00000000100000000', which is unprintable.

The Directory File is not seen by the user and, consequently, cannot be manipulated. The size of the Directory File varies with the number of files described thereby.

Figure 7:
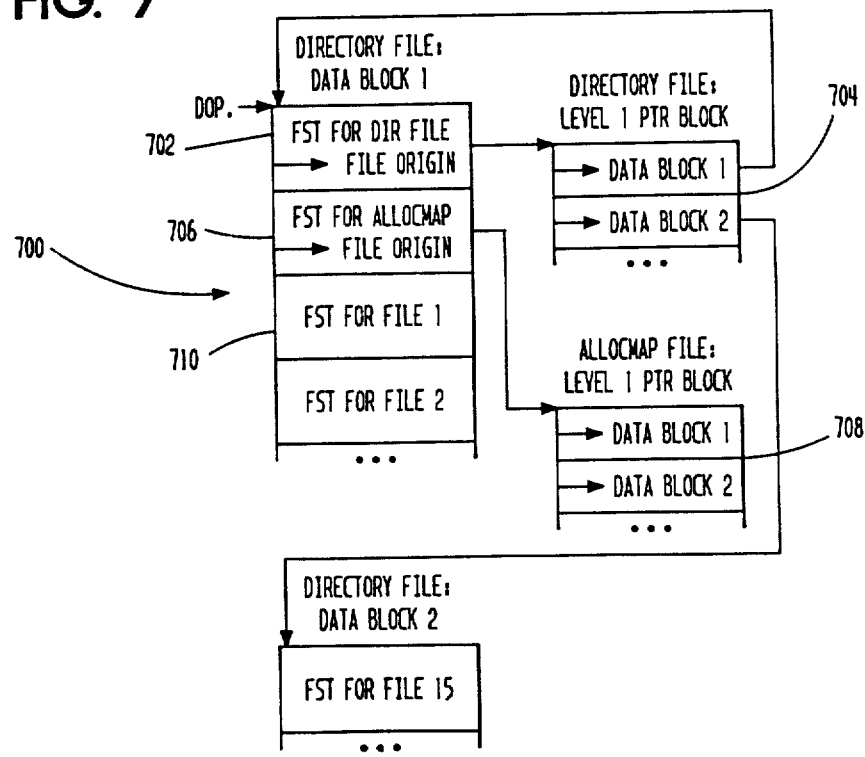

Referring now also to FIG. 7, an example for a Directory File is depicted and referred to generally as reference numeral 700. The first FST 702 that it contains describes the Directory File itself. The first pointer in its first pointer block points back to the first data block 704. This is the same block to which the Disk Origin Pointer (DOP) points.

The second file described in the Directory File is always the Allocation Map 706. The pointer in the Allocation Map points to the data blocks 708 in the Allocation Map file.

The first user file FST 710 is the third one in the File Directory.

There is no limitation for the number of files per CMS disk. It should be understood, however, that the minimum space for a file is one CMS block and that CMS blocks are needed for the Directory File and the Allocation Map.

When the CMS disk is accessed in Read/Write mode, a copy of the Directory File is brought into the user's virtual storage. The Directory File is updated at least at the end of every CMS command if any data was changed. This updating is done selectively in the preferred embodiment. Thus, only the changed CMS blocks are written to disk.

All blocks are always written to a different location, including the first data block which is located at either CMS block 4 or 5. This is done so that the previous Directory File can be recovered in an emergency situation.

The allocation of CMS blocks is described in the Allocation Map 708. It contains one bit position for every CMS block in the CMS disk. When a bit is set to 1, the corresponding block is currently allocated.

The filetype of the Allocation Map is ALLOCMAP. Its filename is '0000000200000000' and it is invisible to the user. The size of this file depends on the size of the CMS disk.

When a CMS disk is accessed in Read/Write mode, a copy of its Allocation Map resides in the user's virtual storage. Whenever necessary, the disk copy is updated. Unlike the Directory File, this is not done selectively.

In operation, a programmer types or enters by any other input means the letters VMV followed by an address. The programmer may also enter the letters VMV alone, in which case a full screen of data is displayed.

Figure 3:
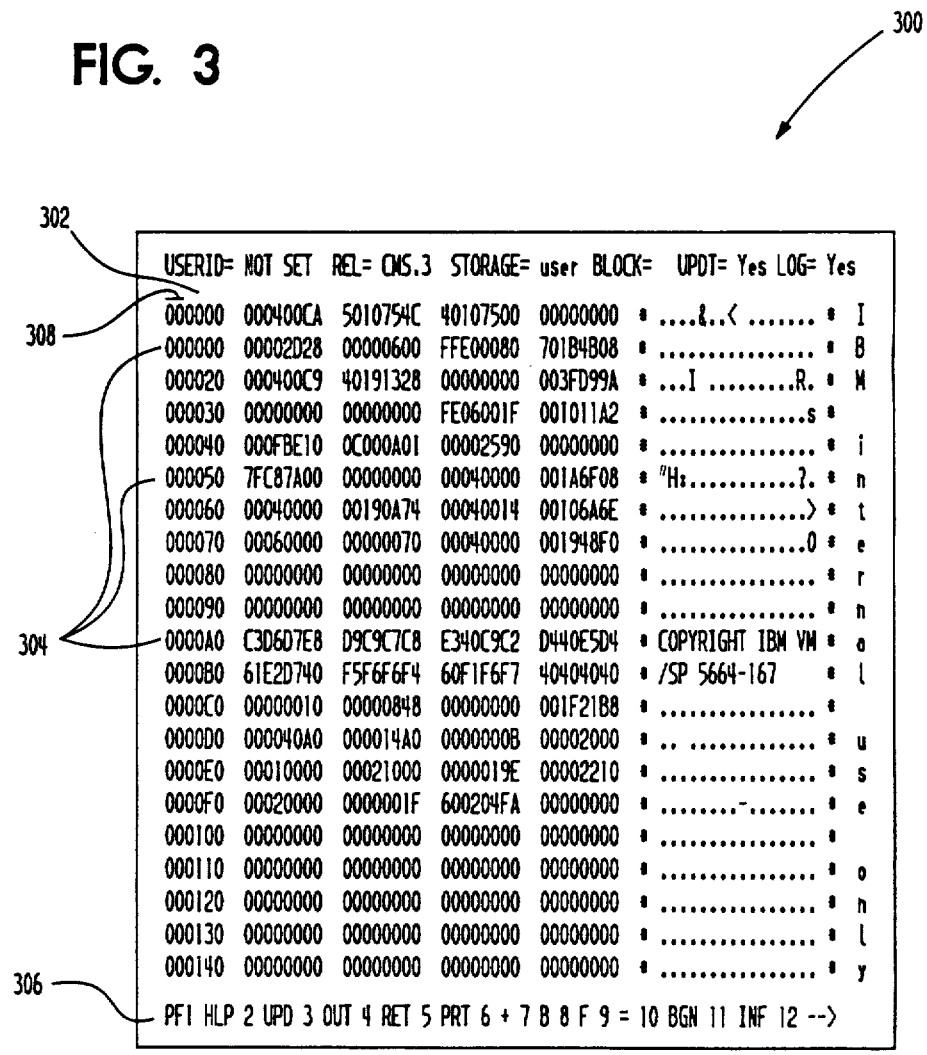
FIG. 3 is a display screen of virtual storage seen by a user when practicing the present invention.

Referring now also to FIG. 3, a full screen as viewed by a programmer is shown generally at reference numeral 300. The second line is the command line 302 followed by lines of data 304. The bottom title line 306 describes the settings of the program function (PF) keys. The data lines 304 are in a format similar to the CP DISPLAY command with the TRANSLATE option, except the present editing system also translates lower case letters.

The cursor 308 can be moved to either the hexadecimal data fields or translated EBCDIC fields and the user can type over what is currently displayed. When the ENTER key on a keyboard, not shown, is depressed, storage is modified.

By utilizing editing system subcommands, the user can locate or scroll to additional storage locations or can terminate the editing system session. The editing system also allows a user to display and modify secondary storage media such as minidisks, directly without requiring the virtual machine to access the media.

Under the CMS operating system, as hereinabove described, minidisks are formatted into 512, 800, 1024, 2048 or 4096 byte blocks. Blocks are identified by the sequential order in which they appear. The editing system can be used to read specific minidisk blocks into storage where they can be modified and written back to the disk. This capability is useful for tracing through file pointers and rebuilding them or for flipping the directories to save lost files before the second directory s updated. The minidisk label may be rewritten, if desired.

The editing system MODULE is a module that executes in the user program area. It loads the editing system MODULE as a nucleus extension with the name VMV. The nucleus extension function allows the user to identify command entry points in programs established in free storage so that they may be called by an interface as if they were nucleus commands. This structure allows a user to issue any valid CP, CMS, or EXEC commands from the editing system without overlaying the program.

When the editing system is used for the first time or when it is being loaded, the external new PSW is replaced with a PSW that points to the VMV address in the nucleus extension. Once VMV is established as a nucleus extension, it can be called from CP using the command "EXT 15" without overlaying the active program. The EXTERNAL command simulates an external interrupt to the virtual machine and returns control to that machine using the address in the external new PSW. When the editing system terminates, it sets an ADSTOP on the next instruction of the traced program that should have been executed before the editing system interrupted. Any other external interrupts access the original external new PSW.

Inter-User Communications Vehicle (IUCV) 110 (FIG. 1) and single console image facility (SCIF) 118 are used by the editing system, as hereinabove mentioned. As herinabove described, IUCV 110 is a communications facility that allows users to pass any amount of information. It enables a program running in virtual machine 102 to communicate with other virtual machines 104, 106, with a CP system service or with itself.

SCIF 118 allows one user logged on to a single virtual machine 102 to control multiple disconnected virtual machines 104, 106. CP appends a prefix to any output coming to the controlled or secondary virtual machine 104, 106, from or on behalf of the originating virtual machine 102. The prefix is the user identification of the originating virtual machine. The controlling or primary virtual machine 102 communicates with the virtual machine(s) it is controlling 104, 106 via the CP SEND command.

In order to execute the editing system in one virtual machine and operate on the storage of a second virtual machine, the second virtual machine must be defined as a secondary user identification to the first one using the CONSOLE control statement in the Directory. Once the two virtual machines are related, the editing system runs in the first virtual machine and displays the storage of the second virtual machine which runs disconnected.

The CP SEND command transfers all the commands and storage modifications to the second machine. To display the storage, a CP DISPLAY command is issued to the second machine. IUCV, which is connected to the *MSG system services, traps the responses. These responses come in through SCIF containing the storage displayed by the CP DISPLAY command. The number of messages depends on the size of the screen. Once all messages are trapped, they are processed into a full screen of storage.

The minidisk editing is done by the DIO module using DASD BLOCK I/O system service to read and write the minidisk blocks. IUCV connects the editing system to DASD BLOCK I/O by connecting to *BLOCKIO system service.

"Addressing Exception" is trapped by the editing system in case the user tries to display storage which is greater than the virtual machine size. This trapping facility is useful when trying to display any segments which are above the virtual machine range or when a mistake is made such as the entering of an address of non-addressable storage. The "Addressing Exception" is trapped by replacing the next instruction address in the program new PSW with an entry point in the editing system.

The IOS3270 full screen manager is a facility written to use the functions provided by the IBM Model 3270 display station family. In the preferred embodiment, the editing system operates by using any Model 327x terminal. The IOS3270 manager displays data entry panels, also referred to as selection menus. A panel can be used to give explanations or to ask the operator to specify required parameters to perform a function.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. In an editing system for use in a virtual machine environment in which at least two virtual machines each have independent virtual memory areas, the improvement comprising:
   an editing system in one of said at least two virtual machines for accessing the virtual memory of said other virtual machine; comprising:
   means at said one virtual machine for accessing said other virtual machine's virtual memory without said other virtual machine's attention;
   an SCIF facility for transferring the data from said other virtual machine virtual memory to said one virtual machine;
   means at said one virtual machine for displaying and editing said transferred data; and
   means for transferring edited data from said one virtual machine back to said other virtual machine for storage in said other virtual machine's virtual memory.

2. The editing system of claim 1 wherein said editing system is enabled to transfer data from said other virtual machine memory to said one virtual machine memory only when said other virtual machine is identified to said one virtual machine.

3. The editing system of claim 1 wherein said editing system further comprises:
   a magnetic storage disk;
   means at said one virtual machine for invoking a DASD BLOCK I/O service for transferring data from said magnetic storage disk to said one virtual machine; and,
   means for transferring edited data back to said storage disk.

4. The editing system in accordance with claim 1 further comprising means at said one virtual machine for printing said data stored in said other virtual machine virtual memory.

5. The editing system according to claim 1 wherein said editing data of is performed in full screen mode.

6. The editing system according to claim 1 including means for trapping information stored in said other of said virtual machines, said information being indicative of data displayable on a terminal, said trapping being effected by identifying a predetermined storage address and initiating an editing mode thereafter.

7. The editing system according to claim 5 further comprising means operatively connected to said display means for translating information into hexadecimal format for output to a peripheral device of said one virtual machine.

8. The editing system according to claim 5, further comprising means operatively connected to said display means for translating information into EBCDIC format for output to a peripheral device of said one virtual machine.

9. The editing system according to claim 1 wherein said editing system performs file editor operations.

10. The editing system according to claim 9 wherein one of said file editor operations is a search operation.

11. The editing system according to claim 9 wherein one of said file editor operations is a scroll operation.

12. The editing system according to claim 9 wherein said file editor operations are performed on a display by data modification in full screen fashion.

13. The editing system according to claim 12, wherein said displayed modified data is printed on a printer.

14. The editing system according to claim 38 wherein said file editor operations are performed on a display on which status information of programs is displayed.

15. The editing system according to claim 9 wherein said file editor operations are effected by associating predetermined storage addresses with identification names.

16. A system for use in accessing stored data comprising:
   (a) a control program executable by a computer;
   (b) a primary virtual machine having a virtual memory and an editing system loaded therein and subservient to said control program;
   (c) a secondary virtual machine having a virtual memory;
   (d) means connected to said primary virtual machine for accessing said secondary virtual machine virtual memory, including an SCIF facility for transferring data from said secondary virtual machine virtual memory to said primary virtual machine;
   (e) means at said primary virtual machine for modifying said transferred data; and,
   (f) means for transferring modified data from said primary virtual machine to said secondary virtual machine virtual memory.

17. The system according to claim 16 wherein said means for allowing said first virtual machine to modify data comprises means for selecting a device on which to output said data stored in said second virtual machine memory.

* * * * *